United States Patent
Yokota et al.

(10) Patent No.: US 7,577,119 B2
(45) Date of Patent: Aug. 18, 2009

(54) MOBILE NETWORK, AND DATA COMMUNICATION METHOD THEREFOR

(75) Inventors: Hidetoshi Yokota, Saitama (JP); Takeshi Kubo, Saitama (JP); Akira Idoue, Saitama (JP); Masugi Inoue, Tokyo (JP); Khaled Mahmud, Dhaka (BD)

(73) Assignees: KDDI Corporation, Tokyo (JP); National Institute of Information and Communications Technology, Incorporated Administrative Agency, Tokyo (JP)

( * ) Notice: Subject to any disclaimer, the term of this patent is extended or adjusted under 35 U.S.C. 154(b) by 521 days.

(21) Appl. No.: 11/071,453

(22) Filed: Mar. 4, 2005

(65) Prior Publication Data

US 2005/0195782 A1 Sep. 8, 2005

(30) Foreign Application Priority Data

Mar. 5, 2004 (JP) .............................. 2004-062880

(51) Int. Cl.
 H04Q 7/00 (2006.01)
 H04Q 7/24 (2006.01)
 H04L 12/28 (2006.01)
 H04W 36/00 (2006.01)
(52) U.S. Cl. ........................ 370/331; 370/338; 370/392; 455/437
(58) Field of Classification Search ................ 370/338, 370/331, 349, 401, 473, 389; 455/436, 442, 455/433, 435.1, 432.1
See application file for complete search history.

(56) References Cited

U.S. PATENT DOCUMENTS

| 6,041,358 | A  | * | 3/2000  | Huang et al.     | 709/238 |
|-----------|----|---|---------|------------------|---------|
| 6,160,804 | A  | * | 12/2000 | Ahmed et al.     | 370/349 |
| 6,466,964 | B1 | * | 10/2002 | Leung et al.     | 709/202 |
| 6,473,413 | B1 | * | 10/2002 | Chiou et al.     | 370/331 |
| 7,031,709 | B2 | * | 4/2006  | Watanabe et al.  | 455/436 |
| 7,096,273 | B1 | * | 8/2006  | Meier            | 709/236 |
| 7,301,923 | B2 | * | 11/2007 | Petrescu et al.  | 370/331 |

(Continued)

FOREIGN PATENT DOCUMENTS

JP           11-075245 A        3/1999

OTHER PUBLICATIONS

C. Perkins, "IP Mobility Support for IPv4", Internet Draft, Nokia Research Center, RFC 3344, IETF, Aug. 2002, pp. 1-89.

(Continued)

Primary Examiner—Nittaya Juntima
(74) Attorney, Agent, or Firm—Westerman, Hattori, Daniels & Adrian, LLP.

(57) ABSTRACT

A data communication method and apparatus for a mobile network. A destination foreign agent (FA2) recognizes a MAC address of an MN. The FA2 registers the MAC address of the MN in a handoff request message (FHReq), and the FA2 feeds the FHReq onto a transfer network. Each of foreign agents (FAs) receives the FHReq, registers an IP address corresponding to the MAC address in the FHReq when the MAC address is registered in a binding list of the FAs themselves, and feeds the IP address onto the transfer network. The FA2 receives the FHReq, and temporarily registers the MAC address and the IP address in the binding list of the FA2 itself. The FA2 transfers data sent from a homw agent (HA) to the MN, based on the information which has been temporarily registered.

2 Claims, 3 Drawing Sheets

U.S. PATENT DOCUMENTS

| | | | |
|---|---|---|---|
| 2002/0143993 A1* | 10/2002 | Jung | 709/245 |
| 2002/0191561 A1 | 12/2002 | Chen et al. | |
| 2003/0185172 A1 | 10/2003 | Rue | |
| 2004/0097232 A1* | 5/2004 | Haverinen | 455/436 |
| 2004/0202126 A1* | 10/2004 | Leung et al. | 370/331 |
| 2005/0195782 A1* | 9/2005 | Yokota et al. | 370/338 |
| 2006/0193272 A1* | 8/2006 | Chou et al. | 370/310 |

OTHER PUBLICATIONS

K. Ei Malki, "Low Latency Handoffs in Mobile IPv4", Internet Draft, Ericsson, Oct. 2003, pp. 1-49.

C.Williams, "Localized Mobility Management Goals" Internet Draft, MCSR Labs, Feb. 3, 2003, pp. 1-18.

E. Gustafsson et al., "Mobil IPv4 Regional Registration", Internet Draft, Ericsson, Nov. 22, 2003, pp. 1-40.

European Search Report, dated May 4, 2006, issued in corresponding European Application No. 05 00 4794.

Japanese Office Action dated May 27, 2009, issued in corresponding Japanese patent application No. 2004-062880.

Jyh-Cheng Chen et al., "Fast Link Layer and Intra-Domain Handoffs for Mobile Internet", Computer Software and Applications Conference, 2000. COMPSAC 2000. The 24th Annual International, IEEE, Oct. 27, 2000, P325-330.

* cited by examiner

PRIOR ART

GFA: Gateway FA
RFA: Regional FA

MOBILE NETWORK, AND DATA COMMUNICATION METHOD THEREFOR

BACKGROUND OF THE INVENTION

1. Field of the Invention

The present invention relates to a mobile network, and a data communication method therefor, wherein a home agent is connected to a home network for mobile nodes, foreign agents are connected to destination networks for the mobile nodes, each of the foreign agents directly or indirectly accommodates one or more wireless base stations, and data to be transferred from the home agent to the mobile nodes is transferred to the mobile nodes through the destination foreign agents and the wireless base stations in the destination networks.

2. Description of the Related Art

In the non-patent document 1, a mobile Internet Protocol (IP) has been standardized as a technology by which an Internet node can continue communication with the same IP address even if the node moves between different networks. In the mobile IP protocol, it is required to register the position of a mobile node (MN) in a destination foreign agent (FA), and a home agent (HA) in a home network every time the MN moves between different networks. Accordingly, there is caused a problem that data transfer to the MN is interrupted until the above registration is completed.

The non-patent document 2 has disclosed the following two techniques to solve the above problem: (a) a handoff technique in which the position of an MN is registered in the destination FA through the origin FA before the MN moves to a new network; and (b) another handoff technique in which data which has reached an origin FA is directly transferred to the destination FA, and, then, is delivered to an MN before the registration of the MN position is completed in the destination FA.

FIG. 5 is a schematic view showing the handoff technique described in the above (a), wherein the MN receives an agent advertisement of the destination FA (FA1), and registers the position of the MN (expressed as "Pre-Registration" in the non-patent document 2) in the destination FA through the origin FA (FA0) before the MN moves to the new network.

FIG. 6 is a schematic view showing the handoff technique described in the above (b), wherein, assuming that the origin FA0 or the destination FA1 can use through some means information (L2 trigger) on the movement of a layer 2, a two-way tunnel is established between the FAs after moving, and packets to the MN are transferred from the origin FA0 to the destination FA1 (expressed as "Post-Registration" in the non-patent document 2).

Moreover, the non-patent documents 3 and 4 has disclosed a technology, which is called "micro mobility", and by which movement in a certain region such as cities is efficiently controlled, as a technique to reduce delays in processing and transfer for registration of the position of an MN in an HA whenever the MN moves between networks. In the non-patent document 4, it has been proposed as shown in FIG. 7 that FAs are hierarchised in a certain area, and the position of an MN is locally registered such that the position of the MN is registered only in way FAs (a GFA and RFAs in the drawing) when the MN moves in the area.

[Non-Patent Document 1] C. Perkins, "IP Mobility Support for IPv4", RFC3344, IETF, 2002.

[Non-Patent Document 2] K. E I Malki, "Low Latency Handoffs in Mobile IPv4", draft-ietf-mobileip-lowlatency-handoffs-v4-07, IETF, 2003.

[Non-Patent Document 3] C. Willims, "Localized Mobility Management Goals", draft-ietf-mipshop-lmm-requirements-02, IETF, 2003.

[Non-Patent Document 4] E. Gustafsson, et al. "Mobile IPv4 Regional Registration", draft-ietf-mobileip-reg-tunnel-08, IETF, 2003.

In conventional technologies, there is required an assumption that it should be known, before the MN moves, which of FAs is a destination FA, or it should be understood, after the MN moves, which of FAs is an origin FA, because the origin FA and the destination FA relay and transfer data to the MN before mobile IP registration of the position. Accordingly, there are the following problems when a communication method such as a wirelesses LAN as represented by IEEE 802.11 is used:

(1) When the origin FA requires the destination FA to register the position of an MN before the MN moves, in the first place, it is difficult for an FA on a communication network to acquire information on a subsequent destination of the MN beforehand, because the MN takes the initiative in moving, and in the second place, it is difficult for an FA on a communication network to securely acquire the IP address and the MAC address of the destination FA beforehand, because movement of the layer 2 is started, based on the status of the wireless channel for the MN; and (2) when a destination FA requires an origin FA to transfer data to an MN after the MN moves, in the first place, after the MN moves, and before mobile IP registration request of the position, it is difficult for the destination FA to find the origin FA, in the second place, it is difficult for the destination FA to know the HA of the MN beforehand before mobile IP registration of the position, though the HA for the MN has information on the origin FA, and in the third place, though it can be thought that the MN has information on the origin FA, and the information is transmitted to the destination FA, the MN is required to recognize, in order for the MN to recognize the destination FA, by using a mobile IP mechanism for movement detection that the MN itself moves, and it takes a time to realize the above described process.

When a communication method such as the wireless LAN is used, the above described problems have made it difficult to apply a conventional handoff technique without alteration to the method.

SUMMARY OF THE INVENTION

The object of the present invention is to solve the above described problems of the related arts, and to provide a mobile network, and a data communication method therefor, by which registration of the position of a mobile node in a destination FA of the mobile node can be completed in a short period.

In order to achieve the above described object, the invention is characterized in that the invention includes: a procedure by which wireless connection is established between an MN and a destination FA, and the destination FA recognizes the MAC address of the MN; a procedure by which the destination FA registers the MAC address of the MN in a MAC address field of a handoff request message including the MAC address field and the IP address field; a procedure by which the destination FA feeds the handoff request message onto a transfer network where the FA itself and a plurality of other FAs are connected to one another; a procedure by which each of the other FAs receives the handoff request message, and it is judged whether the MAC address is corresponding to an IP address in a binding list of the FA itself; a procedure by which other FAs having the MAC address and an IP address which are corresponding to each other in the binding list of the FAs themselves register the IP address in the IP address field of the received handoff request message; a procedure by which the other FAs feed the handoff request message on to the transfer network; a procedure by which the destination FAs receive the handoff request message, and temporarily register the MAC address and the IP address in the binding list of the destination FAs themselves; and a procedure by which the destination FAs transfer data sent from the HA to the MN, based on the information which has been temporarily registered.

According to the invention, the handoff technique can be realized at a higher speed than that of the related arts, and communication cutoff time in the handoff technique can be reduced because registration of the position of the MN in the destination FA of the MN can be completed at a higher speed than that of a case in which a registration procedure, which is standardized in the conventional mobile IP technology, is applied.

DETAILED DESCRIPTION OF THE PREFERRED EMBODIMENT

Figure 1:
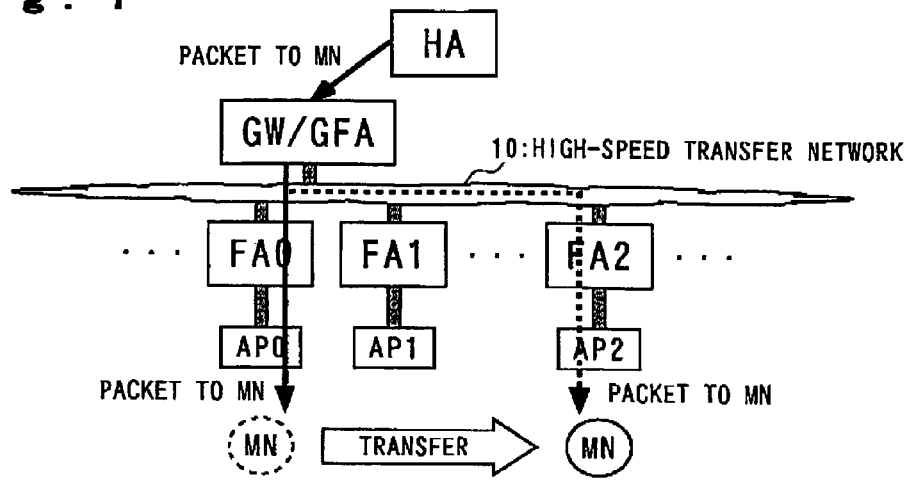
FIG. 1 is a block diagram of a mobile network to which a communication method according to the present invention is applied.

FIG. 1 is a block diagram of a mobile network to which a data communication method according to the present invention is applied, wherein the network comprises a plurality of foreign agents (FAs) (FA1, FA2, FA3, . . . ) which are connected to one another through a high-speed layer 2 transfer network 10 according to, for example, IEEE 802.17 (Resilient Packet Ring). A HA and the above described transfer network 10 are connected to each other through the GW or a gateway FA (GFA), but it is not necessarily required that the position of the MN is registered in GFA. All the packets which are transferred to a mobile node (MN) from GW or GFA are transferred to FAs through the transfer network 10. Each of the FAs receives only packets with a destination address which is registered in a binding list for each FA, and transfers the packets to a network in the direction to the MN.

Figure 2:
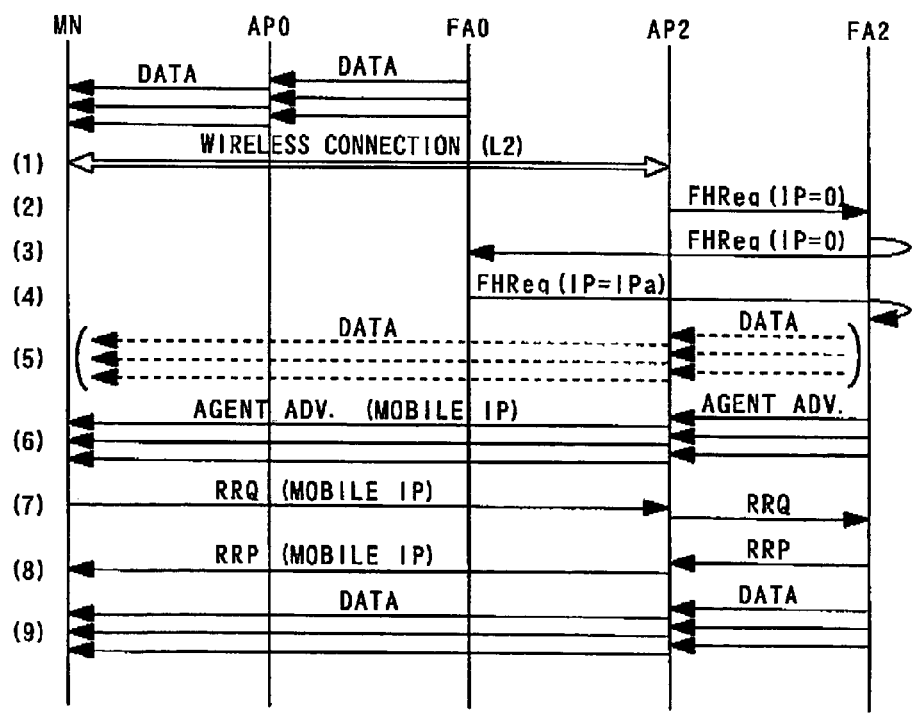
FIG. 2 is a sequence flow showing a handoff procedure for the communication method according to the invention.

FIG. 2 is a sequence flow showing the handoff procedure for the communication method according to the invention. Here, an explanation will be started from the state in which the MN has completed registration of the position in the FA0 through an access point AP0, and communicates with the other end node through the FA0.

(1) When the MN moves into the communication area of an access point AP2, and completes layer 2 wireless connection with the AP2, the destination AP2 acquires a MAC address of the MN.

Figure 3:
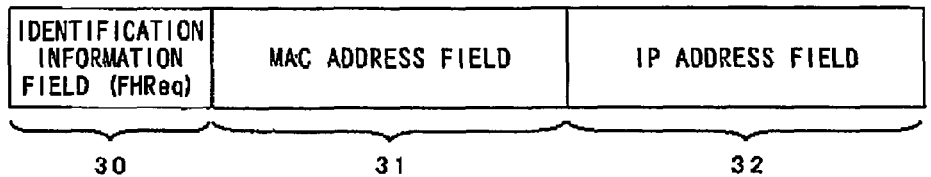
FIG. 3 is a view showing a field structure of a high-speed handoff request message (FHReq).

(2) The AP2 registers the above described MAC address of the MN in a MAC address field 31 of a Fast Handoff Request message (FHReq), which comprises an identification information field 30, the MAC address field 31, and an IP address field 32 as shown in FIG. 3 as one example, and sends the message to an FA2. As the AP2 has acquired only the MAC address of the MN, but has not obtained the IP address at this time, an IP address has not been registered in the IP address field 32 in the above described FHReq.

(3) The FA2 feeds the FHReq received from the AP2 onto the above described transfer network 10. This FHReq is transferred to the FA1, the FA2, and the FA3 through the transfer network 10.

Figure 4:
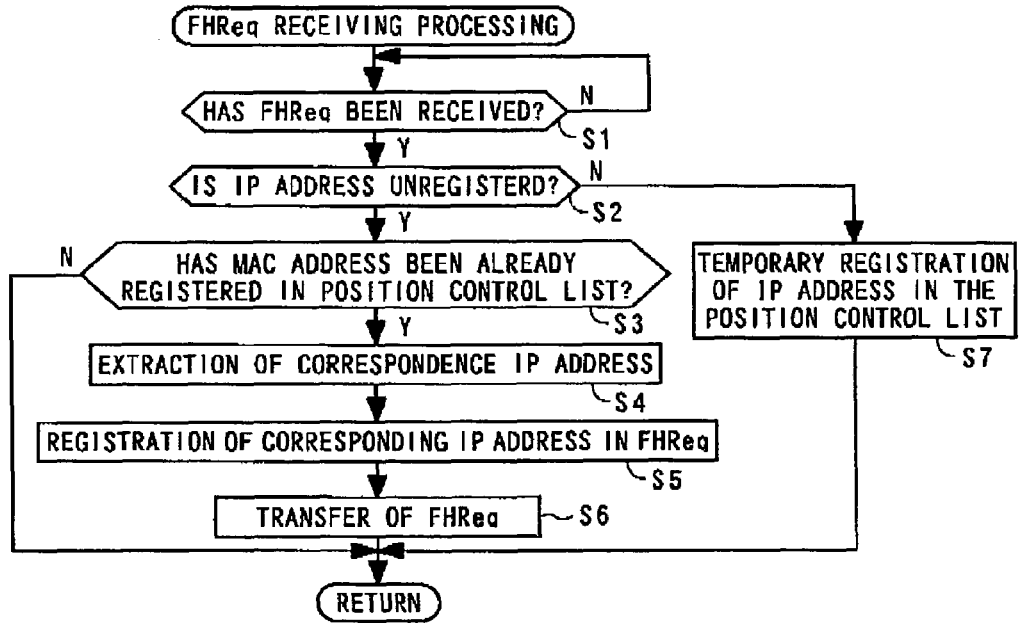
FIG. 4 is a flow chart for "FHReq receiving processing".
Figure 5:
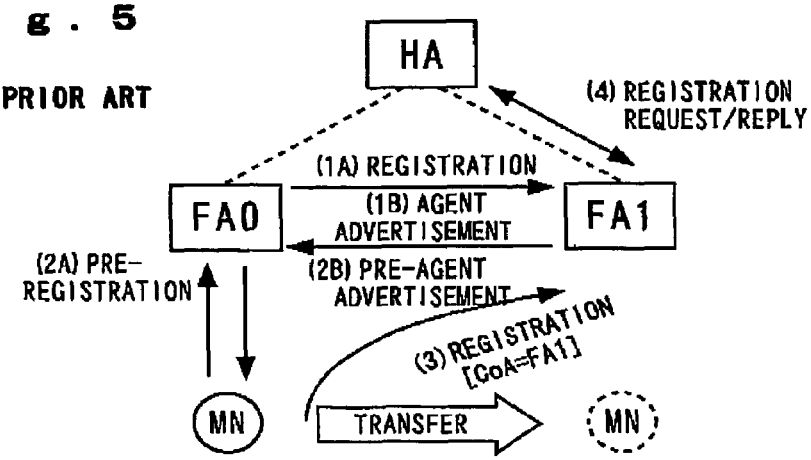
FIG. 5 is a block diagram showing the handoff procedure based on "Pre-Registration" disclosed in the non-patent document 2.
Figure 6:
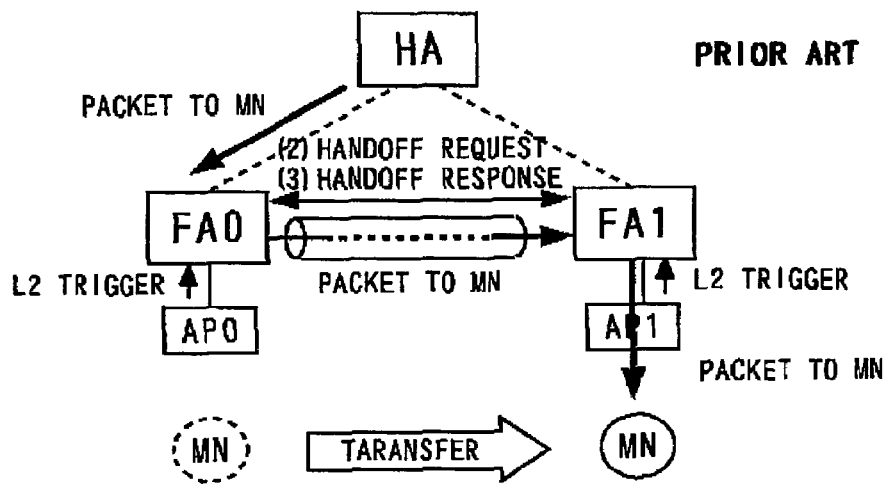
FIG. 6 is a block diagram showing the handoff procedure based on "Post-Registration" disclosed in the non-patent document 2.
Figure 7:
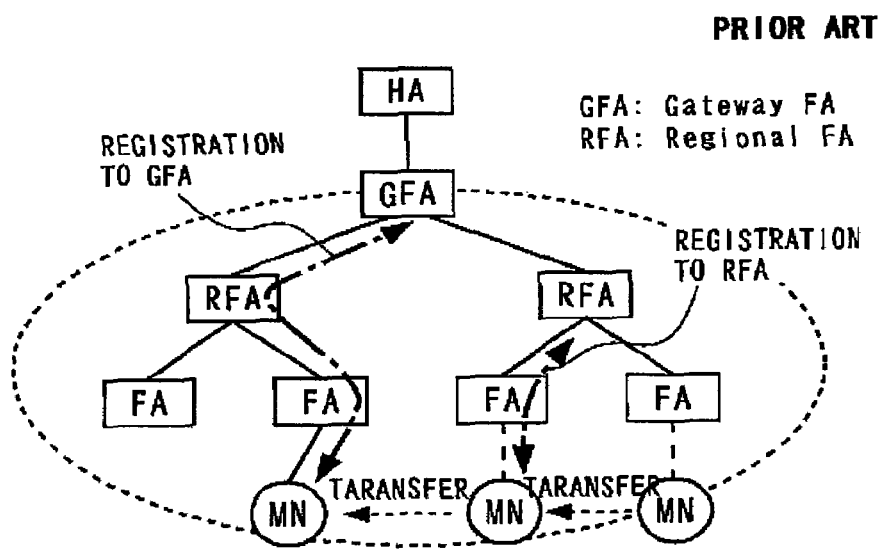
FIG. 7 is a block diagram showing the handoff procedure based on "micro mobility" disclosed in the non-patent document 4.

(4) All the FAs which receive the above described FHReq execute "FHReq receiving processing" shown in FIG. 4. In this "FHReq receiving processing", the FHReq is received at STEP S1, and it is judged at STEP S2 whether an IP address is registered in the IP address field 32 of the FHReq. If the IP address is not registered, the processing proceeds to STEP S3 at which it is checked whether the MAC address stored in the MAC address field 31 of the above described FHReq is registered in the binding list of the FAs themselves.

As it is judged in the case of FA0 that the above described MAC address has been already registered in the binding list, the processing proceeds to STEP S4 at which an IP address (IPa) corresponding to the above described MAC address is extracted from the above described binding list. At STEP S5, the above described extracted IP address (IPa) is registered in the IP address field 32 of the above described FHReq, and, at STEP S6, is fed again onto the above described transfer network 10 in STEP S6.

In the above described FA2, the above described retransmitted FHReq is received at STEP S1 shown in FIG. 4; it is judged at STEP S2 that the IP address has been already registered, and the processing proceeds to STEP S7. At STEP S7, a pair of the MAC address and the IP address registered in the FHReq are extracted, and are registered in the binding list of the FA2 itself.

(5) As the FA2 can recognize the IP address of the MN at this stage, the FA2 can identify packets for the MN on the transfer network 10 to transfer the packets to the MN through the AP2. At this point, the MN can restart data transfer.

(6) Thereafter, the MN detects the destination by receiving the agent advertisement which is sent from the FA2 on a regular basis.

(7) According to a usual mobile IP procedure for registration, the MN carries the IP address of the FA2 on a registration request (RRQ), and notifies the IP address to the HA.

(8) Responding to this RRQ, the HA transfers a registration reply (RRP) to the MN through the FA2 and the AP2. Thereby, the MN is registered in the binding list of the FA2 on a formal basis.

(9) According to the usual mobile IP, data transfer is restarted from the timing concerned, based on the binding list after the above described registration on a formal basis. On the other hand, data transfer has been already restarted at the timing described at the above described item (5) according to the embodiment.

What is claimed is:

1. A data communication method for a mobile network including a destination foreign agent and a plurality of other foreign agents connected to each other through a high-speed transfer network and in which data transferred to a mobile node from a home agent is transferred to the mobile node through the destination foreign agent and a wireless base station in the destination foreign agent, each of the foreign agents includes a binding list which is adapted to control a correspondence between MAC addresses and IP addresses of mobile nodes, comprising:

establishing wireless connection between the mobile node and the destination foreign agent, and the destination foreign agent recognizes the MAC address of the mobile node;

the destination foreign agent registering the MAC address of the mobile node in a MAC address field of a handoff request message including the MAC address field and an IP address field;

the destination foreign agent feeding the handoff request message onto the transfer network where the destination foreign agent and the plurality of other foreign agents are connected to one another;

each of the plurality of other foreign agents receiving the handoff request message, and judging whether the MAC address corresponds to an IP address of the mobile node in a binding list of the foreign agent itself;

registering, by other foreign agents having the MAC address and an IP address which corresponds to the MAC address in the binding list of the foreign agents themselves, the IP address in the IP address field of the received handoff request message;

the other foreign agents having the MAC address and the IP address which corresponds to the MAC address in the binding list feeding the handoff request message onto the transfer network;

the destination foreign agent receiving the handoff request message, and registering the MAC address and the IP address in the binding list;

the destination foreign agent identifying data sent from the home agent to the mobile node on the transfer network, based on the information which has been registered in the binding list; and the destination foreign agent transferring the identified data to the mobile node.

2. The data communication method for the mobile network according to claim 1, further comprising:

the mobile node notifying the IP address of the destination foreign agent to the home agent by carrying the IP address on a registration request;

the home agent transferring a registration reply to the mobile node through the destination foreign agent, responding to the registration request; and the destination foreign agent registering the mobile node in the binding list of the foreign agent itself, based on the registration reply.

* * * * *